US012726860B2

(12) United States Patent
Xu

(10) Patent No.: US 12,726,860 B2
(45) Date of Patent: Sep. 1, 2026

(54) CELL SWITCHING METHOD AND APPARATUS

(71) Applicant: VIVO MOBILE COMMUNICATION CO., LTD., Dongguan (CN)

(72) Inventor: Hechuan Xu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 576 days.

(21) Appl. No.: 18/202,358

(22) Filed: May 26, 2023

(65) Prior Publication Data

US 2023/0300688 A1 Sep. 21, 2023

Related U.S. Application Data

(63) Continuation of application No. PCT/CN2021/132059, filed on Nov. 22, 2021.

(30) Foreign Application Priority Data

Nov. 27, 2020 (CN) ........................ 202011362543.X

(51) Int. Cl.
*H04W 36/00* (2009.01)
*H04W 84/04* (2009.01)

(52) U.S. Cl.
CPC ...... *H04W 36/0055* (2013.01); *H04W 84/042* (2013.01)

(58) Field of Classification Search
CPC ..... H04W 88/06; H04W 48/18; H04W 48/16; H04W 76/16; H04W 24/10; H04W 36/0061; H04W 36/00698; H04W 36/08; H04W 36/144; H04W 24/02; H04W 28/16; H04W 48/12; H04W 88/10; H04W 24/08; H04W 28/0278; H04W 36/0005; H04W 36/0016; H04W 36/0033; H04W 36/0064; H04W 36/00725; H04W 36/0079; H04W 36/0085; H04W 36/023; H04W 36/249; H04W 40/18; H04W 40/36; H04W 48/02; H04W 48/17; H04W 74/0833; H04W 74/0838; H04W 76/10; H04W 76/15; H04W 76/18; H04W 76/19; H04W 76/27; H04W 76/28; H04W 76/38; H04W 8/24;

(Continued)

(56) References Cited

U.S. PATENT DOCUMENTS 10,485,048 B2 11/2019 Zeng et al.
10,694,580 B2 * 6/2020 Hwang ................ H04W 76/10

(Continued)

FOREIGN PATENT DOCUMENTS

CN 109151931 A 1/2019
CN 111263415 A 6/2020

(Continued)

*Primary Examiner* — Matthew C Sams
(74) *Attorney, Agent, or Firm* — The Webb Law Firm

(57) ABSTRACT

A cell switching method includes: in a case that in a first anchor cell, an electronic device is disconnected from a first network and registers with a second network, determining a second anchor cell or a non-anchor cell in which the electronic device stays resident, if the electronic device cannot access the second network; and accessing, by the electronic device, the first network or the second network in the second anchor cell, or accessing the second network in the non-anchor cell.

12 Claims, 4 Drawing Sheets

(58) Field of Classification Search
CPC . H04W 24/04; H04W 28/0289; H04W 28/08; H04W 36/00; H04W 36/0058; H04W 36/0069; H04W 36/008355; H04W 36/008357; H04W 36/087; H04W 36/22; H04W 36/24; H04W 36/30; H04W 48/08; H04W 48/10; H04W 48/20; H04W 52/0261; H04W 60/04; H04W 72/56
See application file for complete search history.

(56) References Cited

U.S. PATENT DOCUMENTS

| | | | | |
|---|---|---|---|---|
| 11,051,211 | B2 * | 6/2021 | Sharma | H04W 76/16 |
| 11,382,031 | B2 * | 7/2022 | Nimbavikar | H04W 48/18 |
| 11,843,983 | B1 * | 12/2023 | Marupaduga | H04W 36/087 |
| 2013/0183974 | A1 * | 7/2013 | Johansson | H04W 36/249 455/436 |
| 2015/0358838 | A1 * | 12/2015 | Wei | H04W 72/56 370/228 |
| 2018/0332659 | A1 * | 11/2018 | Hwang | H04W 76/16 |
| 2019/0069205 | A1 * | 2/2019 | Lee | H04W 48/20 |
| 2020/0196199 | A1 * | 6/2020 | Sharma | H04W 48/16 |
| 2020/0213939 | A1 * | 7/2020 | Nimbavikar | H04W 48/18 |
| 2021/0044993 | A1 * | 2/2021 | Jha | H04W 36/008355 |
| 2022/0361075 | A1 | 11/2022 | Hu et al. | |

FOREIGN PATENT DOCUMENTS

| | | | | | |
|---|---|---|---|---|---|
| CN | 111698687 | A | | 9/2020 | |
| CN | 111698688 | A | | 9/2020 | |
| CN | 111970719 | A | | 11/2020 | |
| CN | 112469096 | A | | 3/2021 | |
| CN | 113260003 | A | * | 8/2021 | H04W 36/08 |
| CN | 116980100 | A | * | 10/2023 | H04W 24/08 |
| EP | 1985038 | B1 | * | 10/2017 | H04W 48/18 |
| EP | 2664189 | B1 | * | 8/2019 | H04W 36/0061 |
| WO | WO-2013057536 | A1 | * | 4/2013 | H04W 28/16 |
| WO | WO-2021237435 | A1 | * | 12/2021 | H04W 36/24 |

* cited by examiner

CELL SWITCHING METHOD AND APPARATUS

CROSS-REFERENCE TO RELATED APPLICATIONS

This application is a Bypass Continuation Application of PCT/CN2021/132059 filed Nov. 22, 2021, and claims priority to Chinese Patent Application No. 202011362543.X filed Nov. 27, 2020, the disclosures of which are hereby incorporated by reference in their entireties.

BACKGROUND OF THE INVENTION

Field of the Invention

This application relates to the field of communication technologies, and in particular, to a cell switching method and apparatus.

Description of Related Art

At present, there are two networking modes for operator networks, that is, non-standalone (NSA) and standalone (SA). NSA refers to deployment of a first network on existing infrastructure of a second network. For example, infrastructure of an existing network with the fourth generation mobile communication technology (4G) is used for deployment of a network with the fifth generation mobile communication technology (5G). Dual connectivity is used in this mode, so that control signal is still transmitted through the 4G network, while a 5G carrier only carries user data. SA refers to creating the first network to be deployed, for example, creating the 5G network, including a new base station, a new core network, etc., that does not rely on infrastructure of a 4G network and thus is a complete and stand-alone 5G network.

SUMMARY OF THE INVENTION

According to a first aspect, an embodiment of this application provides a cell switching method. The method includes:

in a case that in a first anchor cell, an electronic device is disconnected from a first network and registers with a second network, determining a second anchor cell or a non-anchor cell in which the electronic device stays resident, if the electronic device cannot access the second network; and accessing, by the electronic device, the first network or the second network in the second anchor cell, or accessing the second network in the non-anchor cell.

According to a second aspect, an embodiment of this application provides a cell switching apparatus, including:

- a first determining module, configured to: in a case that in a first anchor cell, an electronic device is disconnected from a first network and registers with a second network, determine a second anchor cell or a non-anchor cell in which the electronic device stays resident, if the electronic device cannot access the second network; and
- a network accessing module, configured to access, by the electronic device, the first network or the second network in the second anchor cell, or access the second network in the non-anchor cell.

According to a third aspect, an embodiment of this application provides an electronic device. The electronic device includes a processor, a memory, and a program or an instruction that is stored in the memory and that can be run on the processor, where when the program or the instruction is executed by the processor, the steps of the method according to the first aspect are implemented.

According to a fourth aspect, an embodiment of this application provides a computer-readable storage medium, where the readable storage medium stores a program or an instruction, and when the program or the instruction is executed by a processor, the steps of the method according to the first aspect are implemented.

According to a fifth aspect, an embodiment of this application provides a chip. The chip includes a processor and a communication interface, the communication interface is coupled to the processor, and the processor is configured to run a program or an instruction to implement the steps of the method according to the first aspect.

According to a sixth aspect, an embodiment of this application provides a program product. The program product is stored in a non-volatile storage medium. The program product is executed by at least one processor to implement the steps of the method according to the first aspect.

According to a seventh aspect, an embodiment of this application provides a communication device, configured to perform the steps of the method according to the first aspect.

In the embodiments of this application, in the case that in the first anchor cell, the electronic device is disconnected from the first network and registers with the second network, the second anchor cell or the non-anchor cell in which the electronic device stays resident is determined if the electronic device cannot access to the second network, so that the electronic device accesses to the first network or the second network in the second anchor cell, or accesses to the second network in the non-anchor cell. In this way, in a case that the electronic device cannot access to the second network in the first network, the device can be ensured to access to the second anchor cell or the non-anchor cell, resolving the problem that the electronic device cannot access to a network in the case that in the first anchor cell, the device is disconnected from the first network and registers with the second network, and guaranteeing reliability of network accessing.

DESCRIPTION OF THE INVENTION

The following clearly describes the technical solutions in the embodiments of this application in conjunction with the accompanying drawings in the embodiments of this application. Clearly, the described embodiments are some but not all of the embodiments of this application. All other embodiments obtained by a person of ordinary skill in the art based on the embodiments of this application shall fall within the protection scope of this application. The terms "first", "second", and the like in the description and the claims of this application are used to distinguish between similar objects, and do not need to be used to describe a specific order or sequence. It should be understood that, data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in the specification and the claims, "and/or" represents at least one of connected objects, and a character "/" generally represents an "or" relationship between associated objects.

The following describes in detail the cell switching method provided in the embodiments of this application through specific embodiments and application scenarios thereof in conjunction with the accompanying drawings.

Theoretically, when an electronic device with the first network (for example, 5G) and the second network (for example, 4G) functions has not registered with the first network in an anchor cell, the second network may be accessed; or when the device has registered with the first network in the anchor cell, the first network and the second network can be assessed. However, in some cases, when the electronic device has only registered with the second network in the anchor cell, the second network cannot be assessed. One of the scenarios includes a case in which two network operators share a base station. For example, when an operator A share a base station with an operator B, and only sharing information of the first network is signed, but sharing information of the second network is not signed, the electronic device using the operator B can only access the first network when registering with the shared base station and being not able to access the second network if there is no registration with the first network.

A method in the embodiments of this application is applied to an electronic device. The electronic device may refer to an access terminal, a user unit, a user station, a mobile station, a mobile console, a remote station, a remote terminal, a mobile terminal, a user terminal, a terminal, a wireless communication device, a user agent, a user apparatus, etc. This is not limited in the embodiments of this application.

Figure 1:
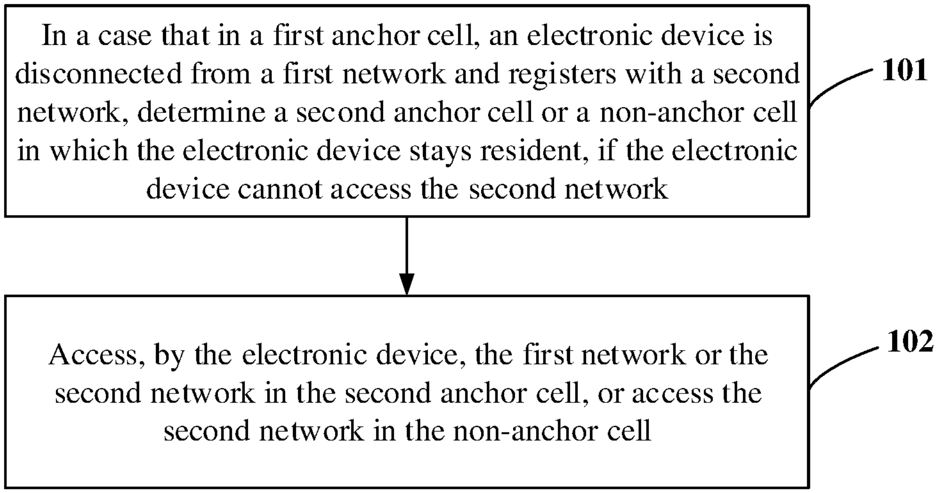
FIG. 1 is a flowchart 1 of a cell switching method according to an embodiment of this application.

As shown in FIG. 1, an embodiment of this application provides a cell switching method that includes the following steps.

Step 101: in a case that in a first anchor cell, an electronic device is disconnected from a first network and registers with a second network, determining a second anchor cell or a non-anchor cell in which the electronic device stays resident, if the electronic device cannot access the second network.

Optionally, the first network may be a 5G network, and the second network may be a 4G network. In this embodiment of this application, an example in which the first network is a 5G network and the second network is a 4G network is used for description. However, this is not limited in this embodiment of this application.

It should be noted that, the anchor cell may be a cell, of the second network, for assisting the electronic device in registering with the first network and using a first network service. For example, the anchor cell may be a cell, of the 4G network, that registers with the 5G network and uses a 5G network service, with transformation by an operator in a manner of software update or the like. The non-anchor cell may be a cell providing registration with the second network to the electronic device.

Optionally, in a case that the electronic device is in an NSA network environment, and in the first anchor cell, is disconnected from the first network and registers with the second network, the second anchor cell or the non-anchor cell in which the electronic device stays resident is determined if the electronic device cannot access the second network.

For example, in a 5G-NSA network environment, the electronic device may only register with the 4G network, or may register with both the 4G network and the 5G network by dual connectivity, that is, register with 5G-NSA. A case in which the electronic device registers with 5G-NSA by dual connectivity and operates normally is beyond the scope of this application. However, when the 5G network environment goes poorer, the electronic device may be disconnected from the 5G network in the first anchor cell and register with only the 4G network. In this case, if the electronic device cannot access the 4G network, the electronic device needs to determine the second anchor cell, or determine the non-anchor cell in which the electronic device stays resident.

Step 102: accessing, by the electronic device, the first network or the second network in the second anchor cell, or accessing the second network in the non-anchor cell.

In this embodiment of this application, in a case that the second anchor cell has been determined, the electronic device may first access the 4G network or the 5G network in the second anchor cell; and in a case that the non-anchor cell for staying resident has been determined, the electronic device may access the 4G network if in a 4G network mode.

In this way, in the case that in the first anchor cell, the electronic device is disconnected from the first network and registers with the second network, the second anchor cell or the non-anchor cell may be switched to if the electronic device cannot access the second network either, thereby guaranteeing reliability of network accessing.

Optionally, the step of in the case that in the first anchor cell, the electronic device is disconnected from the first network and registers with the second network, determining the second anchor cell or the non-anchor cell in which the electronic device stays resident, if the electronic device cannot access the second network may include:

receiving a system message sent from the first anchor cell;

determining, based on the system message, whether the first anchor cell is a cell of a shared base station; and in a case that the first anchor cell is the cell of the shared base station, and in the first anchor cell, the electronic device is disconnected from the first network and registers with the second network, determining the second anchor cell or the non-anchor cell in which the electronic device stays resident, if the electronic device cannot access the second network.

Optionally, the shared base station may refer to a base station providing a network shared among a plurality of operators. The manner of sharing a base station among a plurality of operators may reduce network deployment costs.

Optionally, the first anchor cell may send the system message to the electronic device in a broadcast manner.

In this embodiment of this application, as in a scenario of a shared base station, there is a higher probability that when registering with only a 4G anchor cell, the electronic device cannot access the 4G network. Thus the electronic device determines whether the first anchor cell is the cell of the shared base station based on the system message by receiving and reading the system message broadcast by the first anchor cell. And the second anchor cell or the non-anchor cell in which the electronic device stays resident is determined in the case that the first anchor cell is the cell of the shared base station and the electronic device is disconnected from the 5G network and registers with only the 4G network. In this way, an amount of data to be processed can be reduced, thereby improving efficiency of processing.

Optionally, the step of determining, based on the system message, whether the first anchor cell is the cell of the shared base station may include:

obtaining a quantity of public land mobile networks (PLMN) in the system message; and determining that the first anchor cell is the cell of the shared base station if the quantity of the PLMNs is greater than a preset value.

Optionally, the preset value may be set to 1. If the quantity of the PLMNs is greater than 1, the first anchor cell is determined to be the cell of the shared base station.

PLMN is an identifier of an operator. One PLMN corresponds to one operator, and one operator may have a plurality of PLMNs at the same time. It should be noted that, generally, one operator corresponds to one PLMN, so that in this embodiment of this application, a quantity of operators can be determined based on the quantity of the PLMNs. Clearly, in a case that one operator corresponds to a plurality of PLMNs, in this embodiment of this application, in a manner of determining whether the first anchor cell is the cell of the shared base station based on the quantity of the PLMNs, the quantity of the PLMNs refers to a quantity of PLMNs belonging to different operators. For example, a total quantity of PLMNs is 3, where two PLMNs belong to a first operator, and another PLMN belongs to a second operator. In this case, the quantity of the PLMNs mentioned above in this embodiment of this application is 2, that is a quantity indicating the quantity of operators.

Optionally, before the step of determining the second anchor cell or the non-anchor cell in which the electronic device stays resident, if the electronic device cannot access the second network, the method may further include:

determining that the electronic device cannot access the second network in a case that a value of a buffer status report (BSR) reported by the electronic device within target duration is greater than a preset threshold, where the target duration is greater than a first preset time length.

In this embodiment of this application, in a case that the electronic device has registered with the 4G network, the electronic device, when accessing the network, continuously reports the BSR value to a network device, and the network device decides, based on the BSR value, on how much resources to be scheduled to the electronic device. It should be noted that the BSR is used to indicate how much data the electronic device further need to send to the network device.

Optionally, the electronic device may determine, based on the reported BSR value, whether a network cannot be accessed by the electronic device. Correspondingly, the network device may also determine, based on the BSR value reported by the electronic device, whether a network cannot be accessed by the electronic device.

For example, the electronic device detects whether the reported BSR value is greater than the preset threshold, and in a case that all BSR values continuously reported by the electronic device within a continuous time period, target duration $T_1$, are greater than the preset threshold, where $T_1$ is greater than the first preset time length, that the electronic device cannot access the second network is determined. Optionally, the first preset time length may be 6 s. If BSR values reported by the electronic device within the continuous time period, the target duration $T_1$, are less than or equal to the preset threshold, where $T_1$ is less than or equal to the first preset time length, the target duration $T_1$ is recalculated.

Optionally, a range of the preset threshold may be 0 to 63. It should be noted that, a greater value of the preset threshold indicates more data needs to be sent by the electronic device. In this embodiment of this application, the preset threshold may be 62.

For example, the electronic device continuously detects whether the reported BSR value is greater than 62. If all BSR values reported by the electronic device within a continuous time period longer than 6 s are greater than 62, that the electronic device cannot access a network is determined. If all BSR values reported by the electronic device within a continuous time period of 3 s are greater than 62, but BSR values reported by the electronic device after the continuous 3 s, for example, to 3.5 s, are less than 62, the previous 3.5 s is cleared to zero, and a continuous time for re-counting whether a BSR value is greater than 62 starts after 3.5 s.

Optionally, the method may further include:

in the case that in the first anchor cell, the electronic device is disconnected from the first network and registers with the second network, adding the first anchor cell to a barred cell list if the electronic device cannot access the second network; and in a case that duration in which the added first anchor cell stays in the barred cell list reaches a second preset time length, deleting the first anchor cell from the barred cell list, where the electronic device does not stay resident in a cell that is in the barred cell list.

In this embodiment of this application, in the case that in the first anchor cell, the electronic device is disconnected from the 5G network and registers with the 4G network, the first anchor cell is added to the barred cell list, and the electronic device does not stay resident in the cell that is in the barred cell list. In this way, no access to a network because of misdetection due to residence of the electronic device in the first anchor cell when determining the second anchor cell can be avoided, and reliability of network accessing is further guaranteed.

In the case that the duration in which the added first anchor cell stays in the barred cell list reaches the second preset time length $T_2$, the first anchor cell is deleted from the barred cell list. In this way, after the electronic device determines the second anchor cell or the non-anchor cell, in a case that the electronic device may recover an access to the first anchor cell, an access of the electronic device to the first anchor cell can be ensured.

Optionally, the second preset time length $T_2$ may be 12 min. For example, in the case that in the first anchor cell, the electronic device is disconnected from the 5G network and registers with the 4G network, the first anchor cell is added to the barred cell list. After the duration in which the first anchor cell added by the electronic device stays in the barred cell list reaches 12 min, the first anchor cell is deleted from the barred cell list.

Optionally, the electronic device may autonomously maintain a barred cell list, and the electronic device does not stay resident in a cell that is in the barred cell list.

Optionally, the determining the second anchor cell or the non-anchor cell in which the electronic device stays resident includes:

in a case that a quantity of anchor cells other than the first anchor cell is detected to be N, determining an anchor cell with highest signal quality in the N anchor cells to be the second anchor cell, where N is a positive integer greater than 1; or in a case that no anchor cell other than the first anchor cell is detected, shutting down the first network, and determining the non-anchor cell in which the electronic device stays resident.

In this embodiment of this application, the electronic device may detect whether there is another anchor cell other than the first anchor cell in a current environment, and if one anchor cell other than the first anchor cell is detected, the anchor cell is determined to be the second anchor cell; or if more than one anchor cell other than the first anchor cell is detected, one anchor cell with the highest signal quality (or strongest signal strength) in these anchor cells is determined to be the second anchor cell.

Optionally, in a case that the second anchor cell is determined, the electronic device may initiate normal registration to the second anchor cell and try to access the 4G network or the 5G network.

Optionally, the electronic device may use a maintained anchor cell list and a neighboring cell configured for the first anchor cell to determine whether there is another anchor cell in the current environment.

In this embodiment of this application, in a manner of detecting an anchor cell preferentially, a preferential access to the anchor cell is ensured in a case that the electronic device can access the anchor cell. In a case that the electronic device detects no other anchor cell in the current environment, the 5G network for the electronic device is shut down, the non-anchor cell in which the electronic device stays resident is determined, and the electronic device accesses the 4G network through the non-anchor cell for residence, so that an access of the electronic device to a network can be ensured, thereby helping guarantee reliability of network accessing. In a case that the electronic device detects no other anchor cell is the current environment, the 5G network for the electronic device is shut down to further prevent measurement of a network configuration on the foregoing anomalous anchor cell.

Figure 2:
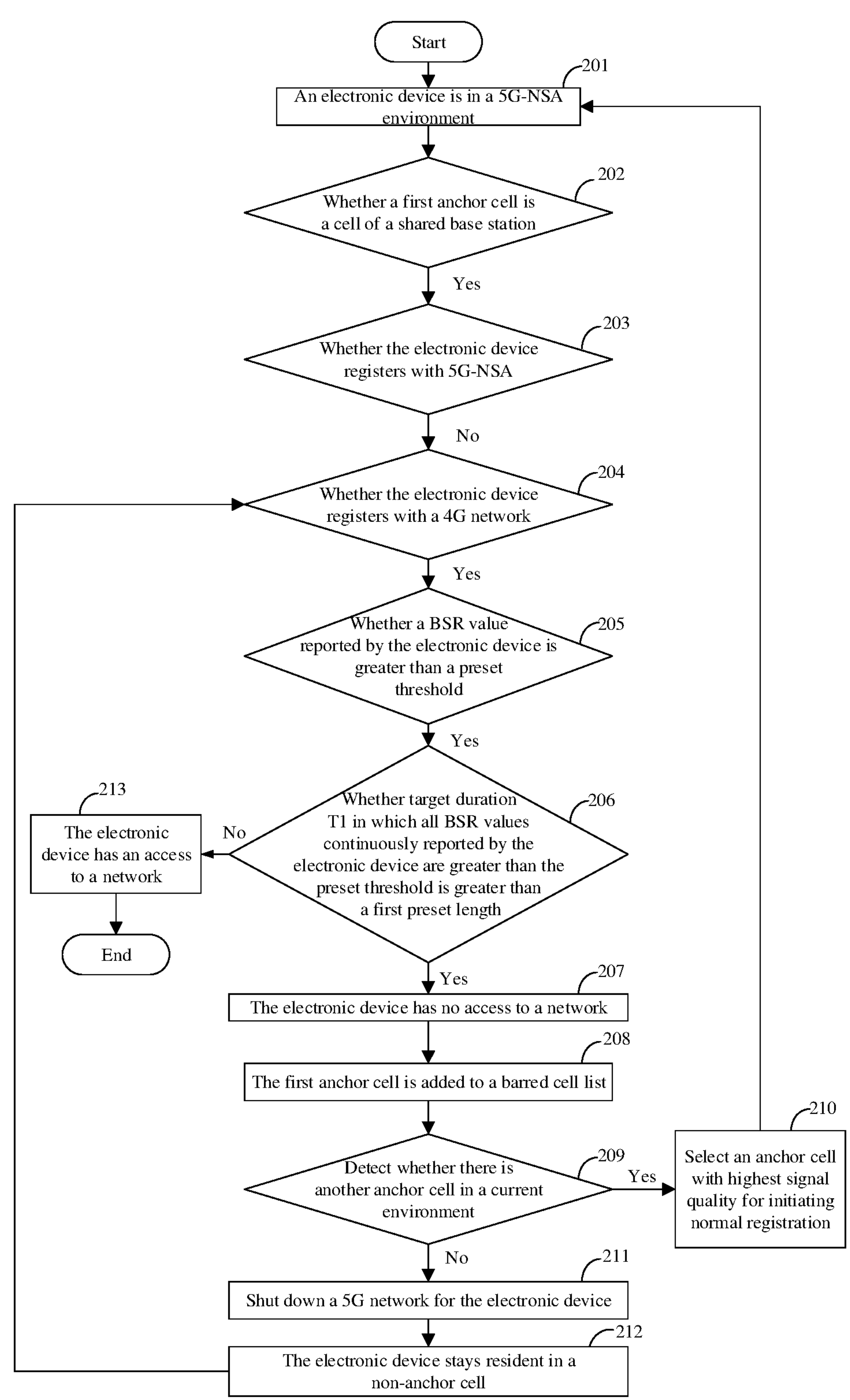
FIG. 2 is a flowchart 2 of a cell switching method according to an embodiment of this application.

In conjunction with FIG. 2, a flowchart of a cell switching method according to an embodiment of this application is described in details.

Step 201: The electronic device is in a 5G-NSA environment.

The electronic device may have only registered with the 4G network, or may have registered with both the 4G network and the 5G network by dual connectivity, that is, registered with 5G-NSA.

Step 202: Whether the first anchor cell is a cell of a shared base station.

The electronic device reads a system message broadcast by the first anchor cell, and determines whether the first anchor cell is the cell of the shared base station based on a quantity of PLMNs in the system message. For example, if the quantity of PLMNs is greater than 1, the 4G cell is the cell of the shared base station. If the first anchor cell is the cell of the shared base station, the following step is performed.

Step 203: Whether the electronic device has registered with 5G-NSA.

When the 5G network environment goes poorer, the electronic device may be disconnected from the 5G network and register with only the 4G network, so that the electronic device has not registered with 5G-NSA. Step 204 is performed next. A case in which the electronic device registers with both the 4G network and the 5G network by dual connectivity, that is, registers with 5G-NSA and operates normally is beyond the scope of this embodiment of this application.

Step 204: Whether the electronic device registers with the 4G network.

The electronic device, when accessing the network, continuously reports a BSR value to a network device, and the network device may decide, based on the BSR value, on how much resources to be scheduled to the electronic device. If the electronic device has registered with the 4G network, the following step is performed.

Step 205: The electronic device detects whether the reported BSR value is greater than a preset threshold.

In this embodiment of this application, a range of the preset threshold may be 0 to 63. For example, the preset threshold may be set to 62. If the electronic device detects that the reported BSR value is greater than the preset threshold, step 206 is performed next.

Step 206: Whether target duration $T_1$ in which all BSR values continuously reported by the electronic device are greater than the preset threshold is greater than a first preset time length.

If all the BSR values continuously reported by the electronic device are greater than the preset threshold, and the target duration $T_1$ in which all the BSR values continuously reported by the electronic device are greater than the preset threshold exceeds the first preset time length, that the electronic device cannot access a network is determined, and step 207 is performed next, otherwise, step 213 is performed next.

If there is one BSR value, within target duration that does not reach the first preset time length, that is not greater than the preset threshold, the target duration $T_1$ is reset. In this embodiment of this application, the first preset time length may be set to 6 seconds.

Step 207: That the electronic device cannot access a network is detected.

A network access recovery procedure is started, that is, step 208 below is performed.

Step 208: The first anchor cell is added to a barred cell list.

The first anchor cell is added to a barred cell list for a second preset time length $T_2$.

In this embodiment of this application, a value of the second preset time length $T_2$ may be 12 minutes.

Step 209: Whether there is another anchor cell in a current environment is detected.

For example, the electronic device may use a maintained anchor cell list and a neighboring cell configured for the first anchor cell for determining, and if there is another anchor cell (the electronic device detects that there is another anchor cell in the current environment), step 210 is performed next, or if no (the electronic device detects that there is no other anchor cell in the current environment), step 211 is performed next.

Step 210: An anchor cell with highest signal quality is selected for initiating normal registration.

An access to the 4G network or the 5G network is attempted, and step 202 is returned.

Step 211: The 5G network for the electronic device is shut down.

After the 5G network for the electronic device is shut down, step 212 is performed next. Shutting down the 5G network can avoid measurement of a network configuration on the first anchor cell.

Step 212: The electronic device stays resident in a non-anchor cell.

The 4G network is accessed, and a network access is normal. Step 204 is returned.

Step 213: The electronic device has an access to the network.

In this embodiment of this application, in the case that in the first anchor cell, the electronic device is disconnected from the 5G network and registers with the 4G network, the second anchor cell or the non-anchor cell in which the electronic device stays resident is determined if the electronic device cannot access the 4G network, so that the electronic device accesses the 5G network or the 4G network in the second anchor cell, or accesses the 4G network in the non-anchor cell, thereby ensuring an access to the second anchor cell or the non-anchor cell in a case that the electronic device cannot access the 4G network in the first anchor cell. This resolves the problem that the electronic device cannot access a network in the case that in the first anchor cell, the electronic device is disconnected from the 5G network and registers with the 4G network.

It should be noted that the cell switching method according to the embodiments of this application may be performed by a cell switching apparatus or a control module that is in the cell switching apparatus and that is configured to perform the cell switching method.

In an embodiment of this application, that the cell switching apparatus performs the cell switching method is used as an example to describe the cell switching apparatus according to this embodiment of this application.

Figure 3:
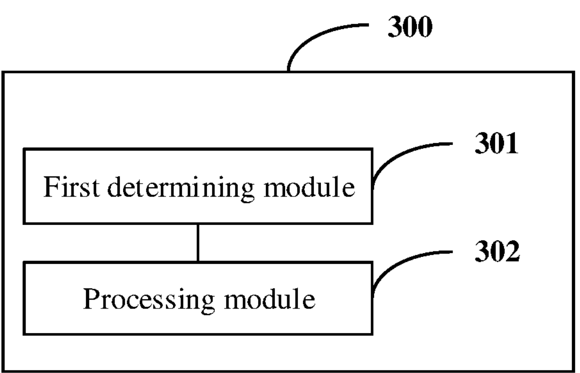
FIG. 3 is a block diagram of a cell switching apparatus according to an embodiment of this application.

FIG. 3 is a block diagram of a cell switching apparatus according to an embodiment of this application. As shown in FIG. 3, the cell switching apparatus 300 includes a first determining module 301 and a network accessing module 302.

The first determining module 301 is configured to: in a case that in a first anchor cell, an electronic device is disconnected from a first network and registers with a second network, determine a second anchor cell or a non-anchor cell in which the electronic device stays resident, if the electronic device cannot access the second network.

The processing module 302 is configured to access, by the electronic device, the first network or the second network in the second anchor cell, or access the second network in the non-anchor cell.

Optionally, the first determining module 301 includes:

a receiving submodule, configured to receive a system message sent by the first anchor cell;

a first determining submodule, configured to determine, based on the system message, whether the first anchor cell is a cell of a shared base station; and a second determining submodule, configured to: in a case that the first anchor cell is the cell of the shared base station, and in the first anchor cell, the electronic device is disconnected from the first network and registers with the second network, determine the second anchor cell or the non-anchor cell in which the electronic device stays resident, if the electronic device cannot access the second network.

Optionally, the first determining submodule includes:

an obtaining unit, configured to obtain a quantity of public land mobile networks PLMNs in the system message; and a determining unit, configured to determine that the first anchor cell is the cell of the shared base station if the quantity of the PLMNs is greater than a preset value.

Optionally, the apparatus 300 further includes:

a second determining module, configured to determine that the electronic device cannot access the second network in a case that a value of a buffer status report BSR reported by the electronic device within target duration is greater than a preset threshold, where the target duration is greater than a first preset time length.

Optionally, the apparatus 300 further includes:

an addition module, configured to: in the case that in the first anchor cell, the electronic device is disconnected from the first network and registers with the second network, add the first anchor cell to a barred cell list if the electronic device cannot access the second network; and a deletion module, configured to: in a case that duration in which the added first anchor cell stays in the barred cell list reaches a second preset time length, delete the first anchor cell from the barred cell list, where the electronic device does not stay resident in a cell that is in the barred cell list.

Optionally, the first determining module 301 includes:

a third determining submodule, configured to: in a case that a quantity of anchor cells other than the first anchor cell is detected to be N, determine an anchor cell with highest signal quality in the N anchor cells to be the second anchor cell, where N is a positive integer greater than 1; or a fourth determining submodule, configured to: in a case that no anchor cell other than the first anchor cell is detected, shut down the first network, and determine the non-anchor cell in which the electronic device stays resident.

According to the apparatus in this embodiment of this application, in the case that in the first anchor cell, the electronic device is disconnected from the first network and registers with the second network, the second anchor cell or the non-anchor cell in which the electronic device stays resident is determined if the electronic device cannot access the second network, so that the electronic device accesses the first network or the second network in the second anchor cell, or accesses the second network in the non-anchor cell, thereby ensuring an access to the second anchor cell or the non-anchor cell in a case that the electronic device cannot access the second network in the first anchor cell. This resolves the problem that the electronic device cannot access a network in the case that in the first anchor cell, the device is disconnected from the first network and registers with the second network, and guarantees reliability of network accessing.

The cell switching apparatus in this embodiment of this application may be an apparatus with an operating system. The operating system may be an Android operating system, an iOS operating system, or another possible operating system. This is not specifically limited in this embodiment of this application.

The cell switching apparatus provided in this embodiment of this application can implement processes implemented in the method embodiments in FIG. 1 to FIG. 2. To avoid repetition, details are not described herein again.

According to the apparatus in this embodiment of this application, in the case that in the first anchor cell, the electronic device is disconnected from the first network and registers with the second network, the second anchor cell or the non-anchor cell in which the electronic device stays resident is determined if the electronic device cannot access the second network, so that the electronic device accesses the first network or the second network in the second anchor cell, or accesses the second network in the non-anchor cell, thereby ensuring an access to the second anchor cell or the non-anchor cell in a case that the electronic device cannot access the second network in the first anchor cell. This resolves the problem that the electronic device cannot access a network in the case that in the first anchor cell, the device is disconnected from the first network and registers with the second network, and guarantees reliability of network accessing.

Figure 4:
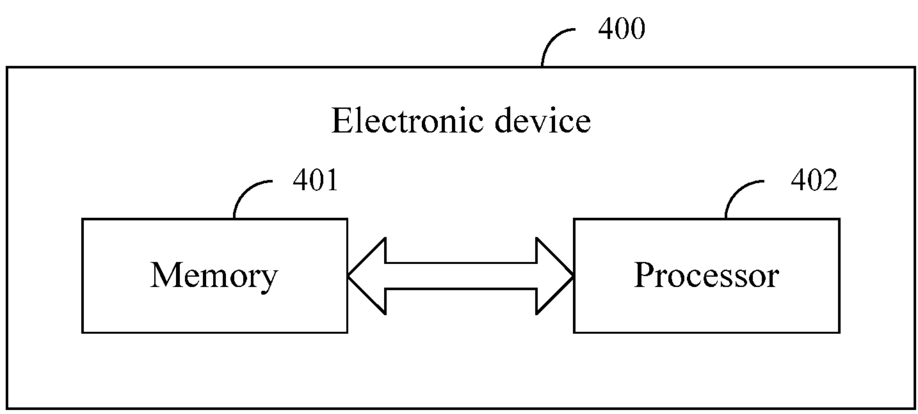
FIG. 4 is a block diagram of an electronic device according to an embodiment of this application.

Optionally, as shown in FIG. 4, an embodiment of this application further provides an electronic device 400, including a processor 401, a memory 402, and a program or an instruction stored in the memory 402 and executable on the processor 401. When the program or the instruction is executed by the processor 401, processes in the foregoing embodiments of the cell switching method are performed, and same technical effects can be achieved. To avoid repetition, details are not described herein again.

It should be noted that the electronic device in this embodiment of this application includes the foregoing mobile electronic device and the foregoing non-mobile electronic device.

Figure 5:
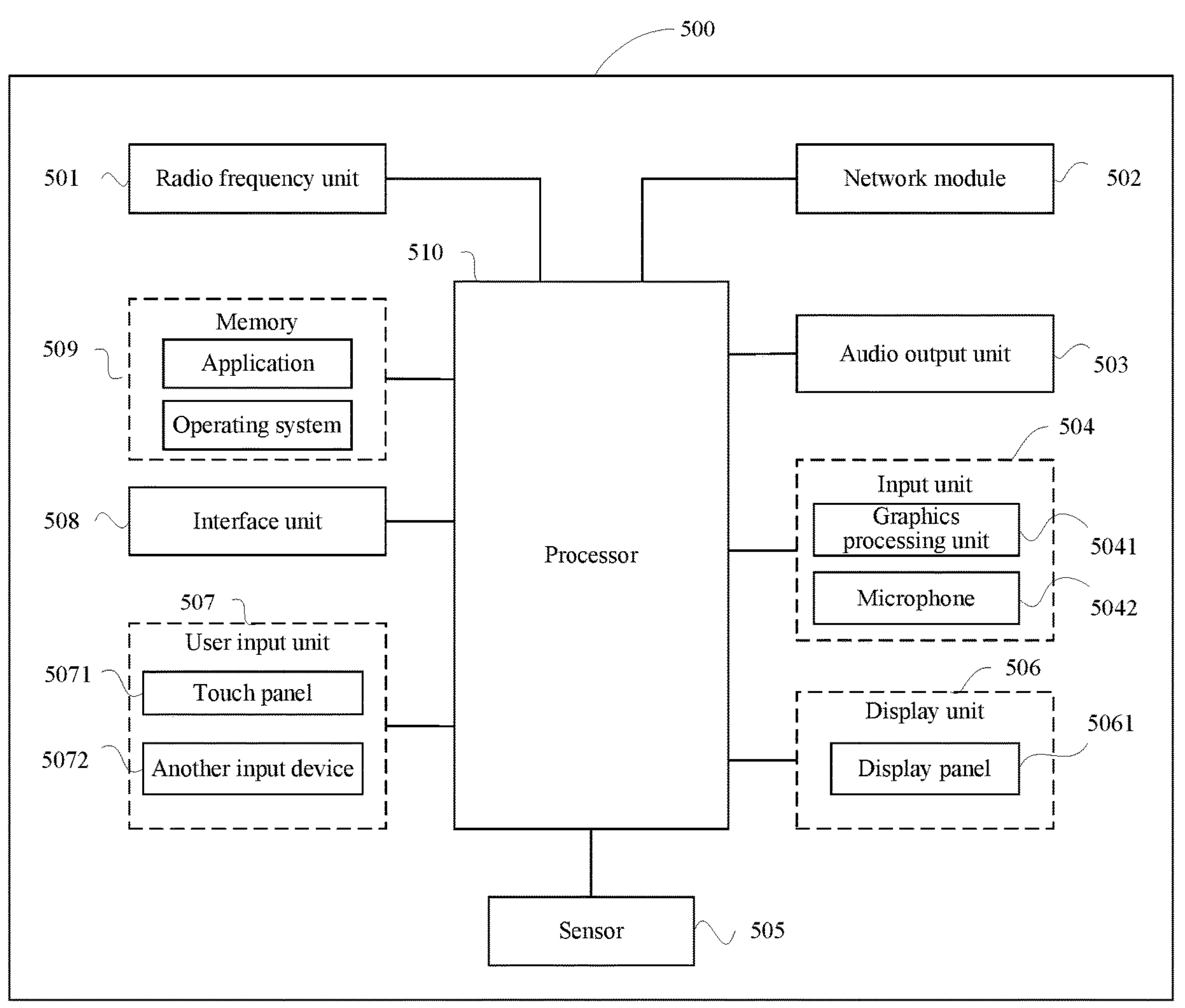
FIG. 5 is a schematic diagram of a hardware structure of an electronic device according to an embodiment of this application.

FIG. 5 is a schematic structural diagram of hardware of an electronic device according to an embodiment of this application.

The electronic device 500 includes but is not limited to components such as a radio frequency unit 501, a network module 502, an audio output unit 503, an input unit 504, a sensor 505, a display unit 506, a user input unit 507, an interface unit 508, a memory 509, and a processor 510.

A person skilled in the art can understand that the electronic device 500 may further include a power supply (such as a battery) that supplies power to each component. The power supply may be logically connected to the processor 510 by using a power supply management system, to implement functions such as charging and discharging management, and power consumption management by using the power supply management system. The structure of the electronic device shown in FIG. 5 does not constitute a limitation on the electronic device. The electronic device may include components more or fewer than those shown in the diagram, a combination of some components, or different component arrangements. Details are not described herein.

The processor 510 is configured to: in a first anchor cell, the electronic device is disconnected from a first network and registers with a second network, determine a second anchor cell or a non-anchor cell in which the electronic device stays resident, if the electronic device cannot access the second network.

The network module 502 is configured to access, by the electronic device, the first network or the second network in the second anchor cell, or access the second network in the non-anchor cell.

Optionally, the radio frequency unit 501 is configured to receive a system message sent by the first anchor cell.

The processor 510 is configured to: determine, based on the system message, whether the first anchor cell is a cell of a base station shared between the first network and the second network; and in a case that the first anchor cell is the cell of the shared base station, and in the first anchor cell, the electronic device is disconnected from the first network and registers with the second network, determine the second anchor cell or the non-anchor cell in which the electronic device stays resident, if the electronic device cannot access the second network.

Optionally, the processor 510 is further configured to: obtain a quantity of public land mobile networks PLMNs in the system message; and determine that the first anchor cell is the cell of the shared base station if the quantity of the PLMNs is greater than a preset value.

Optionally, the processor 510 is further configured to determine that the electronic device cannot access the second network in a case that a value of a buffer status report BSR reported by the electronic device within target duration is greater than a preset threshold, where the target duration is greater than a first preset time length.

Optionally, the processor 510 is further configured to: in the case that in the first anchor cell, the electronic device is disconnected from the first network and registers with the second network, add the first anchor cell to a barred cell list if the electronic device cannot access the second network; and in a case that duration in which the added first anchor cell stays in the barred cell list reaches a second preset time length, delete the first anchor cell from the barred cell list, where the electronic device does not stay resident in a cell that is in the barred cell list.

Optionally, the processor 510 is further configured to: in a case that a quantity of anchor cells other than the first anchor cell is detected to be N, determine an anchor cell with highest signal quality in the N anchor cells to be the second anchor cell, where N is a positive integer greater than 1; or in a case that no anchor cell other than the first anchor cell is detected, shut down the first network, and determine the non-anchor cell in which the electronic device stays resident.

According to the electronic device 500 in this embodiment of this application, in the case that in the first anchor cell, the electronic device is disconnected from the first network and registers with the second network, the second anchor cell or the non-anchor cell in which the electronic device stays resident is determined if the electronic device cannot access the second network, so that the electronic device accesses the first network or the second network in the second anchor cell, or accesses the second network in the non-anchor cell, thereby ensuring an access the second anchor cell or the non-anchor cell in a case that the electronic device cannot access the second network in the first anchor cell. This resolves the problem that the electronic device cannot access a network in the case that in the first anchor cell, the electronic device is disconnected from the first network and registers with the second network, and helps guarantee reliability of network accessing.

It should be understood that, in this embodiment of this application, the input unit 504 may include a graphics processing unit (GPU) 5041 and a microphone 5042, and the graphics processing unit 5041 processes image data of a still picture or a video obtained by an image capture apparatus (such as a camera) in a video capture mode or an image capture mode. The display unit 506 may include a display panel 5061. The display panel 5061 may be configured in a form such as a liquid crystal display or an organic light-emitting diode. The user input unit 507 includes a touch panel 5071 and another input device 5072. The touch panel 5071 is also referred to as a touchscreen. The touch panel 5071 may include two parts: a touch detection apparatus and a touch controller. The another input device 5072 may include but is not limited to a physical keyboard, a functional button (such as a volume control button or a power on/off button), a trackball, a mouse, and a joystick. Details are not described herein. The memory 509 may be configured to store a software program and various data, including but not limited to an application program and an operating system. An application processor and a modem processor may be integrated into the processor 510, the application processor mainly processes an operating system, a user interface, an application program, and the like, and the modem processor mainly processes wireless communication. It can be understood that, alternatively, the modem processor may not be integrated into the processor 510.

An embodiment of this application further provides a readable storage medium. The readable storage medium stores a program or an instruction, when the program or the instruction is executed by a processor, the processes in the foregoing embodiments of the cell switching method are implemented, and same technical effects can be achieved. To avoid repetition, details are not described herein again.

The processor is the processor in the electronic device described in the above embodiment. The readable storage medium includes a computer-readable storage medium, for example, a computer read-only memory (ROM), a random access memory (RAM), a disk, or an optical disc.

An embodiment of this application further provides a chip. The chip includes a processor and a communication interface. The communication interface is coupled to the processor. The processor is configured to run a program or an instruction to implement the processes in the foregoing embodiments of the cell switching method, and same technical effects can be achieved. To avoid repetition, details are not described herein again.

It should be understood that the chip mentioned in this embodiment of this application may also be referred to as a system-level chip, a system chip, a chip system, a system-on-chip, or the like.

An embodiment of this application provides a computer program product. The program product is stored in a non-volatile storage medium. The program product is executed by at least one processor to implement the processes of the foregoing method embodiments, and same technical effects can be achieved. To avoid repetition, details are not described herein again.

An embodiment of this application provides a communication device, configured to perform the processes in the foregoing embodiments of the method, and same technical effects can be achieved. To avoid repetition, details are not described herein again.

It should be noted that, in this specification, the terms "include", "comprise", or any other variant thereof are intended to cover a non-exclusive inclusion, so that a process, a method, an article, or an apparatus that includes a list of elements not only includes those elements but also includes other elements which are not expressly listed, or further includes elements inherent to such a process, method, article, or apparatus. In the absence of more restrictions, an element defined by the words "including a . . . " does not exclude another same element in a process, method, article, or apparatus that includes the element. In addition, it should be noted that a scope of the method and the apparatus in the implementations of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described in conjunction with some examples may be combined in other examples.

Based on the descriptions of the foregoing implementations, a person skilled in the art may clearly understand that the method in the foregoing embodiments may be implemented by software in addition to a necessary universal hardware platform or by hardware only. In most cases, the former is a preferred implementation. Based on such an understanding, the technical solutions of this application essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of this application.

The embodiments of this application are described above in conjunction with the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. A cell switching method, wherein the method comprises:

in a case that in a first anchor cell, an electronic device is disconnected from a first network and registers with a second network, in response to determining that the electronic device cannot access an internet through the second network, determining a second anchor cell or a non-anchor cell in which the electronic device stays resident; and accessing, by the electronic device, the internet through the first network or the second network in the second anchor cell, or accessing the internet through the second network in the non-anchor cell; wherein the determining the second anchor cell or the non-anchor cell comprises:

in a case that a quantity of anchor cells other than the first anchor cell is detected to be N, determining an anchor cell with highest signal quality in the N anchor cells to be the second anchor cell, wherein N is a positive integer greater than 1; or in a case that no anchor cell other than the first anchor cell is detected, shutting down the first network and determining the non-anchor cell in which the electronic device stays resident.

2. The cell switching method according to claim 1, wherein the determining the second anchor cell or the non-anchor cell in which the electronic device stays resident, further comprises:

receiving a system message sent from the first anchor cell;

determining, based on the system message, whether the first anchor cell is a cell of a shared base station; and in a case that the first anchor cell is the cell of the shared base station, performing the determining of the second anchor cell or the non-anchor cell in which the electronic device stays resident.

3. The cell switching method according to claim 2, wherein the determining, based on the system message, whether the first anchor cell is a cell of a shared base station comprises:

obtaining a quantity of public land mobile networks (PLMNs) in the system message; and in response to determining that the quantity of the PLMNs is greater than a preset value, determining that the first anchor cell is the cell of the shared base station.

4. The cell switching method according to claim 1, wherein before determining the second anchor cell or the non-anchor cell in which the electronic device stays resident, the method further comprises:

in response to determining that a value of a buffer status report (BSR) reported by the electronic device within target duration is greater than a preset threshold, determining that the electronic device cannot access the internet through the second network, wherein the target duration is greater than a first preset time length.

5. The cell switching method according to claim 1, further comprising:

in response to determining that the electronic device cannot access the internet through the second network, adding the first anchor cell to a barred cell list; and response to determining that a duration in which the first anchor cell stays in the barred cell list reaches a second preset time length, deleting the first anchor cell from the barred cell list, wherein the electronic device does not stay resident in a cell that is in the barred cell list.

6. An electronic device, wherein the electronic device comprises a processor, a memory, and a program or an instruction stored in the memory and executable on the processor, wherein the program or the instruction, when executed by the processor, causes the electronic device to perform:

in a case that in a first anchor cell, an electronic device is disconnected from a first network and registers with a second network, in response to determining that the electronic device cannot access an internet through the second network, determining a second anchor cell or a non-anchor cell in which the electronic device stays resident; and accessing the internet through the first network or the second network in the second anchor cell, or accessing the internet through the second network in the non-anchor cell; wherein the determining an second anchor cell or a non-anchor cell, comprises:

the program or the instruction, when executed by the processor, causes the electronic device further to perform:

in a case that a quantity of anchor cells other than the first anchor cell is detected to be N, determining an anchor cell with highest signal quality in the N anchor cells to be the second anchor cell, wherein N is a positive integer greater than 1; or in a case that no anchor cell other than the first anchor cell is detected, shutting down the first network, and determining the non-anchor cell in which the electronic device stays resident.

7. The electronic device according to claim 6, wherein the program or the instruction, when executed by the processor, causes the electronic device to perform:

receiving a system message sent from the first anchor cell;

determining, based on the system message, whether the first anchor cell is a cell of a shared base station; and in a case that the first anchor cell is the cell of the shared base station, performing the determining of the second anchor cell or the non-anchor cell in which the electronic device stays resident.

8. The electronic device according to claim 7, wherein the program or the instruction, when executed by the processor, causes the electronic device to perform:

obtaining a quantity of public land mobile networks (PLMNs) in the system message; and in response to determining that the quantity of the PLMNs is greater than a preset value, determining that the first anchor cell is the cell of the shared base station.

9. The electronic device according to claim 6, wherein the program or the instruction, when executed by the processor, causes the electronic device, before performing the determining the second anchor cell or the non-anchor cell in which the electronic device stays resident, to further perform:

in response to determining that a value of a buffer status report (BSR) reported by the electronic device within target duration is greater than a preset threshold, determining that the electronic device cannot access the internet through the second network, wherein the target duration is greater than a first preset time length.

10. The electronic device according to claim 6, the program or the instruction, when executed by the processor, causes the electronic device to further perform:

in response to determining the electronic device cannot access the internet through the second network, adding the first anchor cell to a barred cell list; and in response to determining that a duration in which the first anchor cell stays in the barred cell list reaches a second preset time length, deleting the first anchor cell from the barred cell list, wherein the electronic device does not stay resident in a cell that is in the barred cell list.

11. A non-transitory computer readable storage medium, wherein the non-transitory computer readable storage medium stores a program or an instruction, and when the program or the instruction is executed by a processor, steps of the method according to claim 1 are implemented.

12. A computer program product, wherein the program product is stored in a non-transitory computer readable storage medium, and the program product is executed by at least one processor to implement steps of the method according to claim 1.

* * * * *